Sept. 22, 1931.  B. HASBROUCK  1,824,718
STENOGRAPHER'S APPLIANCE
Filed Feb. 19, 1930
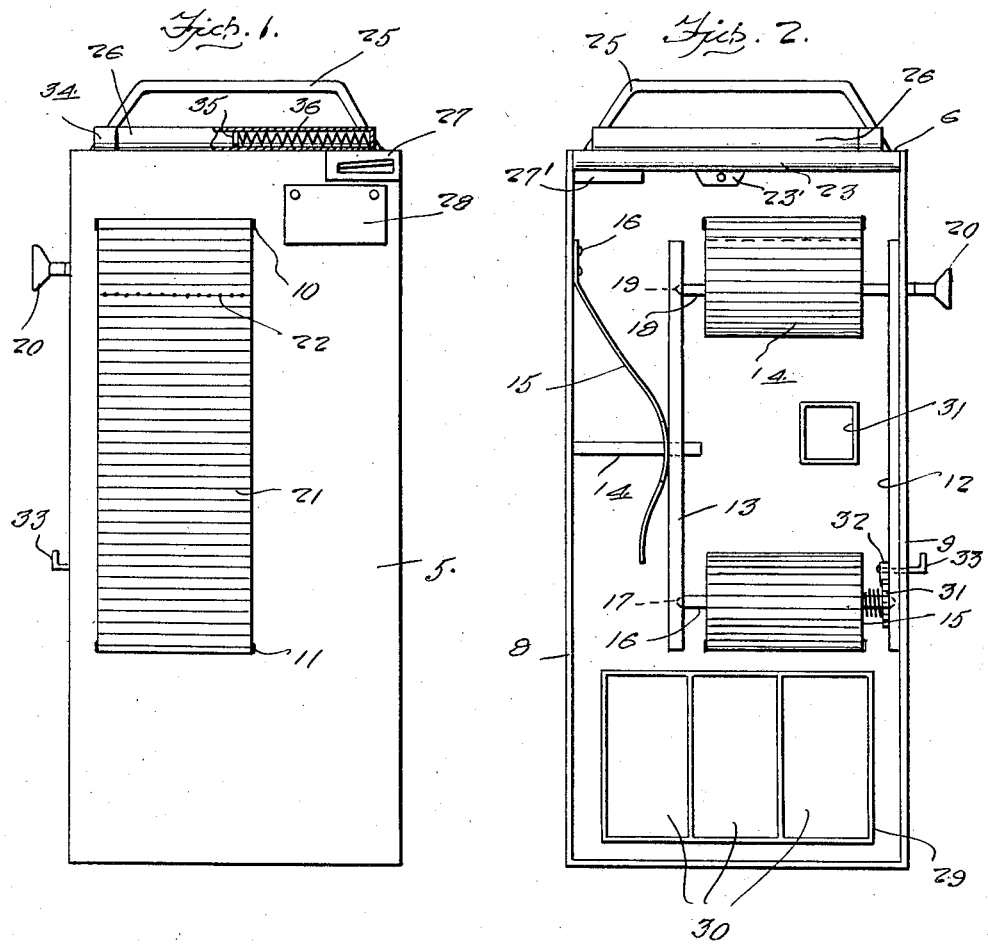
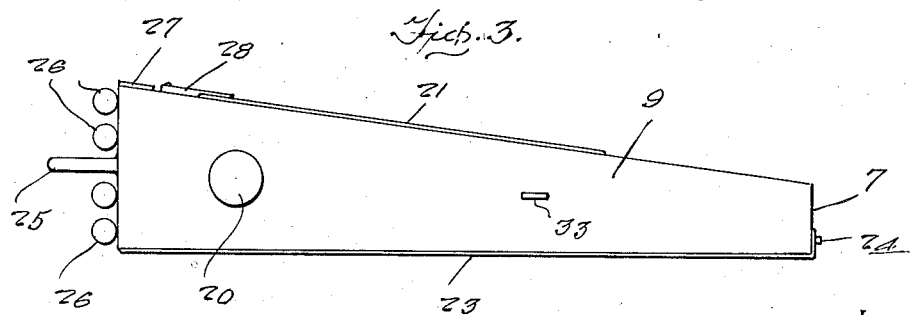
Inventor
Beatrice Hasbrouck
By Clarence A. O'Brien
Attorney Patented Sept. 22, 1931

1,824,718

UNITED STATES PATENT OFFICE

BEATRICE HASBROUCK, OF HIGHLAND, NEW YORK

STENOGRAPHER'S APPLIANCE

Application filed February 19, 1930. Serial No. 429,657.

This invention relates to device for use by stenographers, and has more particular reference to what may be termed a note or memorandum device for stenographers.

The primary object of this invention is to provide a casing having an inclined top wall over which is adapted to travel paper upon which the stenographer may conveniently take notes. The device embodying certain other novel features of construction, arrangement of parts as will be hereinafter more fully made manifest when reference is had to the following description taken in connection with the accompanying drawings wherein:

Figure 1 is a front elevational view of the device,

Figure 2 is a rear elevational view of the device, the bottom of the casing being opened, Figure 3 is an edge elevational view thereof.

Referring to the drawings, it will be seen that my improved device comprises a substantially elongated rectangular casing open at its bottom and including a top wall 5 inclining downwardly from a front end wall 6 to a rear end wall 7, the side walls of the casing being designated by the reference characters 8 and 9 respectively.

Adjacent the wall 9 inwardly from the side of the casing, the top wall 5 is provided with upper and lower transversely extending slots 10 and 11 respectively. Secured to the wall 9 interiorly of the casing is a longitudinally extending bar 12, which bar 12 extends from the top to the lower slot. A second bar 13 of a length corresponding to the length of the bar 12 is disposed in parallelism to said bar 12, and intermediate its ends, said bar 13 is slidable on a guide arm 14 projecting inwardly from the side wall 8.

For normally urging the bar 13 toward the bar 12 there is provided a suitable spring 15 anchored at one end to the upper end portion of the side wall 8 as at 16. Clamped between the bars 12 and 13 adjacent the upper and lower slots 10 and 11 are upper and lower rollers 14 and 15. The ends of the shaft 16 are receivable in suitable recesses 17 formed in the lowermost ends of the bars 12 and 13.

The shaft 18 of the upper roller 14 has one end thereof receivable in a suitable recess 19 in the upper end of the bar 13, and the other end of the shaft 18 extends through the upper end of the bar 12 and side wall 9 and on the extended end of the shaft 18 is removably secured an operating knob 20.

Obviously the bar 13 being pressed inwardly under the action of the spring 15 will retain the shafts 16 and 18 rotatably mounted between the end of the bars 12 and 13. On the roller 15 is rolled a strip of preferably ruled writing paper 21, one end of the writing paper 21 being passed through the lower notch 11 bent upwardly and longitudinally over the top wall 5 through the upper slot 10 trained over the upper roller 14 and secured thereto in any suitable manner, so that obviously by rotating the shaft 18 the paper 21 will in turn be rolled from the roller 15 on to the roller 14.

The roller 16 is preferably of the spring actuated type, and for retaining the shaft 16 against rotation under the influence of its spring, there is provided on one end of the shaft 16 a ratchet wheel 31 with which is adapted to engage a pivoted dog 32, which dog 32 is mounted on the inner end of a rockable handle 33 which extends through the adjacent side wall 9 of the casing.

Manifestly, by actuating the handle 33 for moving the dog 32 out of engagement with the ratchet wheel 31, the spring actuated shaft 16 will be rotated in a suitable direction under the influence of its spring for rewinding the paper 21 upon the roll 15.

If desired, the paper 21 may be provided with spaced transverse lines of perforation 22. Obviously, the wall 5 will provide a suitable backing for the paper 21 travelling thereover so that one may conveniently write upon the paper 21.

For closing the bottom or under side of the casing, there is provided a flexible closure 23, which closure 23 is in the nature of a curtain embodying a spring roller mounted in the upper end of the casing as clearly suggested in Figure 2. The closure 23 is adapted to be unrolled to extend longitudinally over the entire opened bottom of the casing. At its free end the closure 23 is provided with an apertured tab 23' for reception of the retaining pin 24 extending from the end wall 7 of the casing for retaining the closure 23 in a closing position.

Secured to the forward end wall 6 of the casing is a suitable handle 25 whereby the casing may be conveniently carried from place to place. Also mounted on said forward wall 6 at opposite sides of the handle 25 exteriorly of the casing are tubes 26 extending transversely of the casing, and the tubes 26 are adapted to accommodate pens, pencils and the like writing implements.

As shown to advantage in Figure 1, secured to the forward wall 5 of the casing exteriorly of the same and at the upper right hand corner, may be a suitable pencil sharpener designated generally by the reference character 27. The pencil sharpener is of any conventional construction. There is also anchored beneath the sharpener 27 a rectangular plate like spring clip 28, between which clip 28 and the adjacent portion of the wall 5 a writing pad or any other similar element may be clamped.

As shown to advantage in Figure 2 within the casing, and extending transversely thereof at the lower end thereof is a suitable container 29, which container 29 is preferably divided into compartments 30 for reception of additional rolls of paper. A relatively small container 31 is also arranged within the casing between the rolls 14 and 15, and within the container 31 may be placed the knob 20 when it is unscrewed from the shaft 18 as is the case when carrying the device from one place to another.

Mounted within the interior of the casing directly adjacent the pencil sharpener 27 there is a shavings receptacle 27' which will have suitable communication with the pencil sharpener 27 for receiving the pencil shavings therefrom.

Furthermore, as shown to advantage in Figure 1 the tubes 26 are preferably closed at one end, and at their opposite ends are adapted to be closed through the medium of removable caps 34. For normally urging the contents of the tubes 26 outwardly through the open ends of the tubes upon removal of the caps 34, there is provided within each of the tubes a disk like follower 35, and a spring 36 has one end thereof impinging against the end wall of the tube, the other end of the spring being secured to the disk like follower 35 for urging the latter toward the opened end of the tube 26.

It is thought that from the foregoing description, taken in connection with the accompanying drawings, a clear understanding of the operation, structure, utility and advantages of a device of this character will be had by those skilled in the art without a more detailed description.

Even though I have herein shown and described the preferred embodiment of my invention, it is to be understood that the same is susceptible to changes fully comprehended by the spirit of the invention as herein described, and the scope of the appended claims.

Having thus described my invention, what I claim as new is:

1. In a device of the character described, a fixed bar, a movable bar parallel to the fixed bar and movable toward or away from the latter bar, a pair of shafts supported between said bars, spring means normally urging said movable bar in a direction toward the fixed bar for retaining said shafts between said bars, rollers on said shafts for rotation therewith, said rollers being adapted to support and operate a strip of paper or the like.

2. In a device of the character described, a fixed member, a movable member parallel to the fixed member, a guide member for said movable member, said movable member provided with an aperture for accommodating said guide member, spring means normally engaging said movable member for normally urging the same relatively of the guide member and toward said fixed member, a pair of rollers journalled between said movable member and said fixed member and adapted to support and operate a strip, spring means normally urging one of said rollers in one direction, and means acting oppositely to said spring means for normally retaining said one roller against casual rotation.

In testimony whereof I affix my signature.

BEATRICE HASBROUCK.